(12) United States Patent
Binzel et al.

(10) Patent No.: US 7,865,160 B2
(45) Date of Patent: Jan. 4, 2011

(54) MIXED MODE POWER MEASUREMENT CALIBRATION AND REPORTING IN WIRELESS COMMUNICATION NETWORKS

(75) Inventors: Charles P. Binzel, Bristol, WI (US); William P. DeClerck, Palatine, IL (US); Jeffrey C. Smolinski, Schaumburg, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 1224 days.

(21) Appl. No.: 11/426,631

(22) Filed: Jun. 27, 2006

(65) Prior Publication Data

US 2007/0298745 A1    Dec. 27, 2007

(51) Int. Cl.
H04B 17/00    (2006.01)

(52) U.S. Cl. .............. 455/226.2; 455/226.1; 455/226.4; 455/67.11; 455/67.15; 455/67.7; 455/68; 455/522

(58) Field of Classification Search ... 455/226.1–226.4, 455/67.11–67.7, 68–69, 522, 560–561; 370/464–469, 370/473–480
See application file for complete search history.

(56) References Cited

U.S. PATENT DOCUMENTS

| | | | | |
|---|---|---|---|---|
| 5,371,481 A | * | 12/1994 | Tiittanen et al. | 332/103 |
| 5,839,052 A | | 11/1998 | Dean et al. | |
| 5,945,949 A | | 8/1999 | Yun | |
| 6,353,907 B1 | * | 3/2002 | van Nobelen | 714/746 |
| 7,277,678 B2 | * | 10/2007 | Rozenblit et al. | 455/91 |
| 7,283,844 B2 | * | 10/2007 | Thompson | 455/562.1 |
| 7,349,503 B2 | * | 3/2008 | Husted et al. | 375/346 |
| 7,363,049 B2 | * | 4/2008 | Shin et al. | 455/522 |
| 2002/0034191 A1 | | 3/2002 | Shattil | |

OTHER PUBLICATIONS

3GPP TS 45.008, SEC 7.1; "BCCH Carriers"; 1 Page.

* cited by examiner

Primary Examiner—Tuan A Tran
(74) Attorney, Agent, or Firm—Roland K. Bowler, II

(57) ABSTRACT

A wireless communication user terminal having a receiver for receiving a signal having mixed modulation formats, wherein the terminal measures signal power on a portion of the signal received by the terminal, determines a modulation format on the portion of the signal for which the signal power was measured, and modifies the signal power measured based on the modulation format.

18 Claims, 3 Drawing Sheets

MIXED MODE POWER MEASUREMENT CALIBRATION AND REPORTING IN WIRELESS COMMUNICATION NETWORKS

FIELD OF THE DISCLOSURE

The present disclosure relates generally to wireless communications, and more particularly to power measurement calibration in wireless communication devices capable of using multiple modulation formats, for example, GSM mobile stations using Gaussian Minimum-Shift Keying (GMSK) and 8-Phase-Shift Keying (PSK) modulation formats, corresponding entities and methods.

BACKGROUND

The accurate reporting of neighbor cell measurements is generally important to mobile station call performance. For example, strict power measurement requirements are imposed on mobile stations receiving on a channel modulated only by Gaussian Minimum-Shift Keying (GMSK). With the introduction of Enhanced Data for Global Evolution (EGDE) channels using 8 Phase-Shift Keying (8-PSK) in GSM mobile stations, traditional methods of performing power measurements are complicated due to the mixing of GMSK and 8-PSK modulation formats on the broadcast control channel (BCCH) carrier. The BCCH carrier is the channel on which the mobile station (MS) performs power measurements, channel synchronization, and channel identification for handover and reselection. According to 3GPP 05.08, section 7.1, a base station (BS) can lower the mean power on 8-PSK time slots by up to 4 dB without consideration of the mobile station's ability to properly measure and report on the BCCH. However, 3GPP 05.08 section 7.1 does not impose any requirements on the MS for mixed modulation applications, presumably due to the difficulty in performing accurate measurements.

The various aspects, features and advantages of the disclosure will become more fully apparent to those having ordinary skill in the art upon careful consideration of the following Detailed Description and the accompanying drawings described below. The drawings may have been simplified for clarity and are not necessarily drawn to scale.

DETAILED DESCRIPTION

Figure 1:
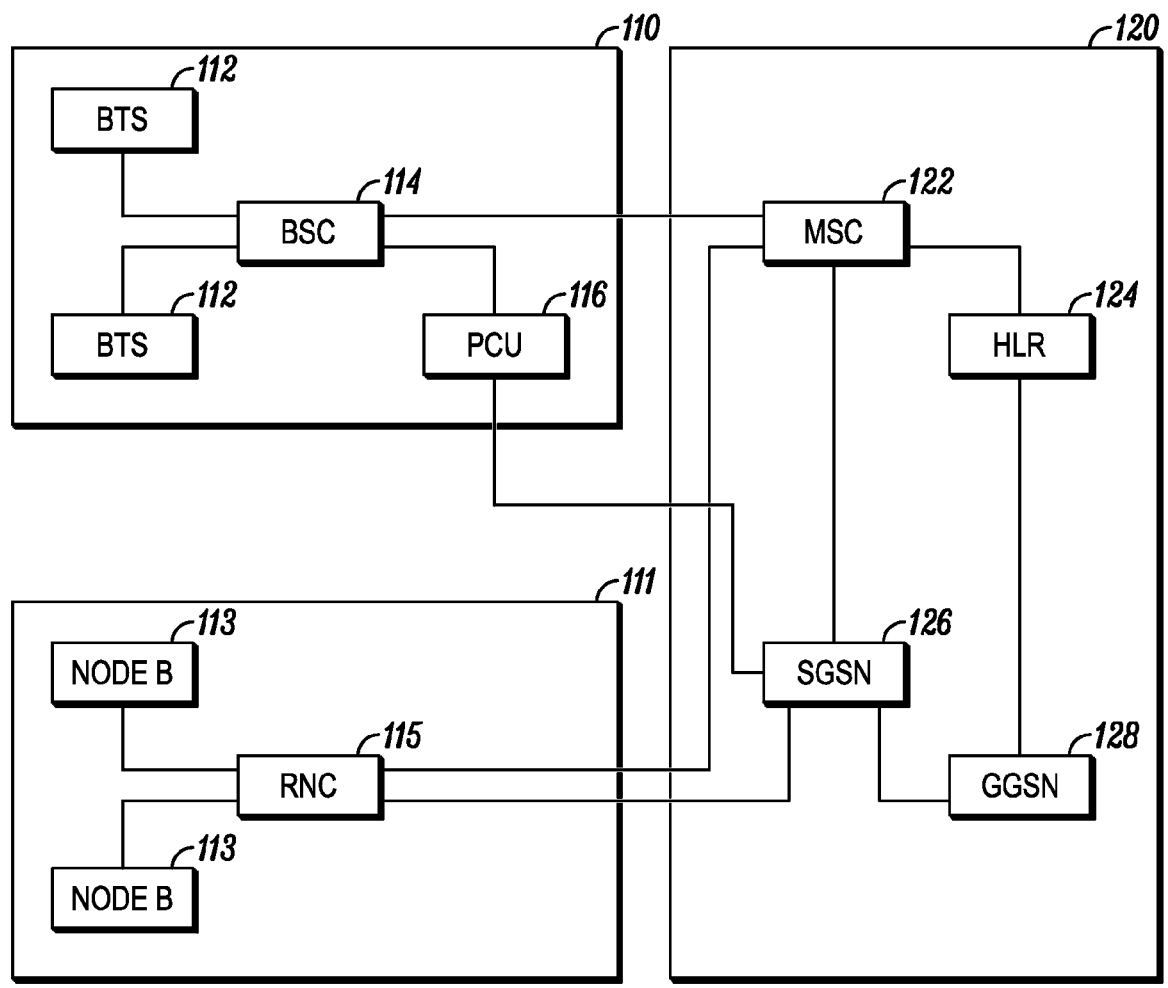
FIG. 1 illustrates a wireless communication system.
Figure 1:
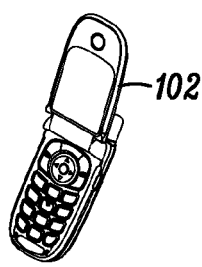

In FIG. 1, an exemplary wireless communication system 100 comprises one or more radio access networks communicably coupled to a core network. An exemplary cellular communication radio access network 110 is a 3GPP GERAN based network, for example, a GSM/EGPRS and Enhanced Data-rates for GSM (or Global) Evolution (EDGE) networks coupled to the core network 120. FIG. 1 also illustrates a 3rd Generation 3GPP WCDMA radio access network 111 communicably coupled to the core network 120. In other embodiments, the wireless communications system comprises other existing and/or future generation networks.

In FIG. 1, the radio access network 110 generally comprises multiple base stations 112 serving cellular areas distributed over corresponding geographical regions, wherein each base station includes one or more cells or sectors. The one or more base stations are communicably coupled to a corresponding controller 114. In GSM radio access networks, the base station is referred to as a base transceiver station (BTS) and the controller is a Base Station Controller (BSC). In FIG. 1, the access network 110 also includes a Packet Control Unit (PCU) 116 communicably coupled to the BSC.

In FIG. 1, the radio access network 111 generally comprises multiple base stations 113 communicably coupled to a corresponding controller 115. In UMTS radio access networks, the base station is referred to as a Node B and the controller is referred to as a Radio Network Controller (RNC).

In FIG. 1, the core network 120 comprises a mobile switching center (MSC) 122 communicably coupled to the controller, for example, the BSC 114 of the access network 110 and the RNC 115 of the access network 111. The MSC is typically communicably coupled to a Public Switched Telephone Network (PSTN) and/or to an Integrated Services Digital Network (ISDN), which is a PSTN utilizing Signaling System Number 7 (SS7) interfaces (common channel telecommunications packet switching). The core network also includes a Home Location Register (HLR) 124 and a Visitor Location Register (VLR), which may be located in the MSC or in some other infrastructure entity. In communication networks with packet service, the core network includes a Serving General packet radio support Serving Node (SGSN) 126 communicably coupled to the PCU 116 and/or the RNC 114. In GSM networks, the PCU provides packet support. The SGSN is typically communicably coupled to a Gateway GPRS Support Node (GGSN) 128, which connects to other packet data networks, for example, the Internet.

In FIG. 1, the base stations communicate with mobile terminals 102, which may be referred to as Mobile Stations (MS) or User Equipment (UE), dependent upon the protocol with which it communicates, to schedule radio resources and to receive and/or transmit data using available radio resources. The wireless communication system may also comprise other infrastructure entities for performing management functionality including data routing, admission control, subscriber billing, terminal authentication, etc., which may be controlled by other network entities. These entities are not illustrated but are known generally by those having ordinary skill in the art.

Figure 2:
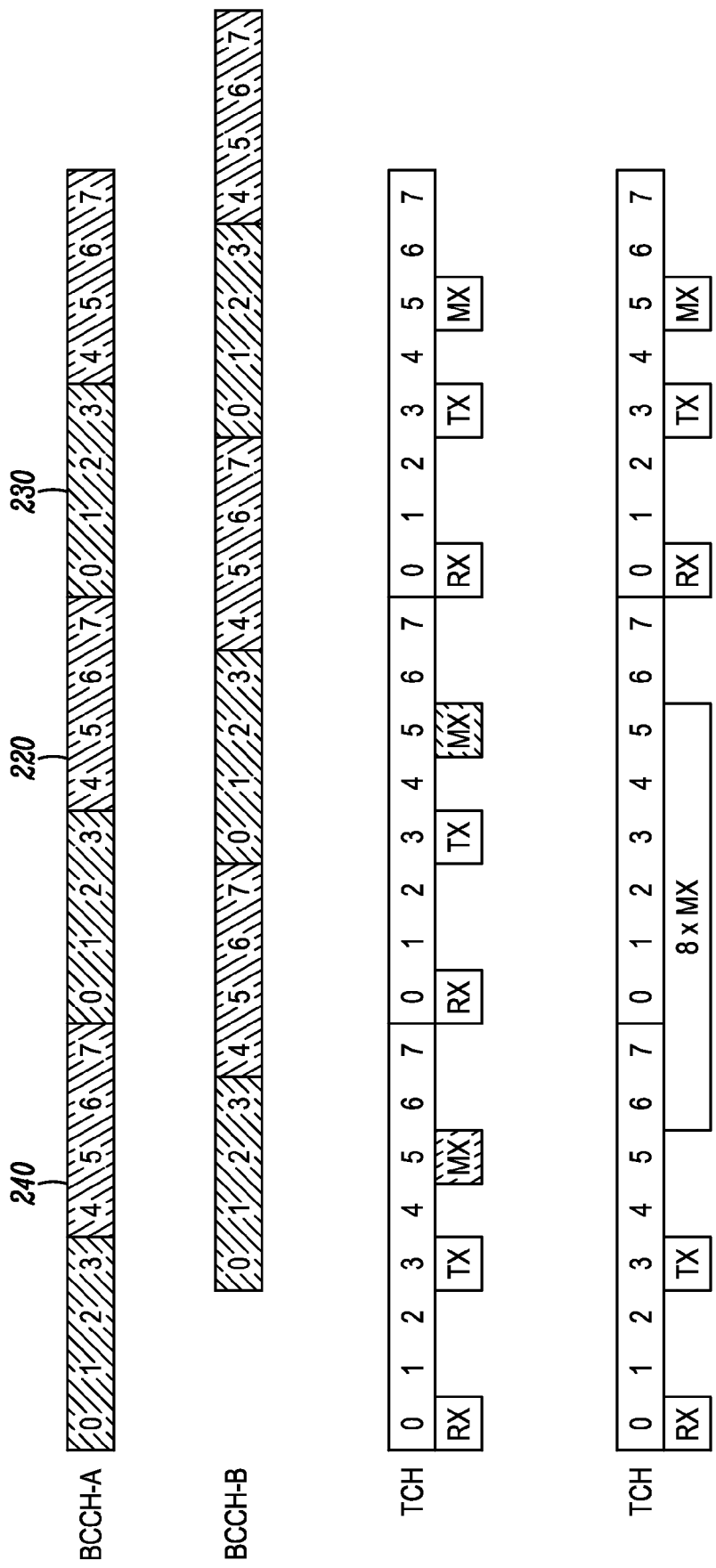
FIG. 2 illustrates several wireless communication channels some of which having multiple modulation formats.

FIG. 2 illustrates various channels in a wireless communication system including broadcast control channels (BCCH-A) and (BCCH-B) and traffic channels (TCH). In one embodiment, the BCCH-A and BCCH-B accommodate multiple modulation formats. For example, the introduction of EGDE channels using 8 Phase-Shift Keying (8-PSK) in GSM mobile stations, results in the mixing of GMSK and 8-PSK modulation formats on the BCCH carrier. Other channels in other communication protocols may also include multiple modulation formats, and thus the disclosure is generally not limited to GERAN and 3G applications. In FIG. 2, BCCH-A is divided into multiple frames 210, 220, 230 ... wherein each frame is divided into eight time slots (0-7). In FIG. 2, in BCCH-A and BCCH-B, time slots 0-3 are modulated using the GMSK format and time slots 4-7 are modulated using the 8-PSK format. BCCH-B is offset in time relative to BCCH-A. In other embodiments, the distribution of the modulation format throughout the frame may be different.

In one embodiment where the channel includes multiple modulation formats, the wireless communication user terminal modifies signal power measurements using a calibration factor that is based on the modulation format on a particular portion of the channel on which the signal power was measured.

Figure 3:
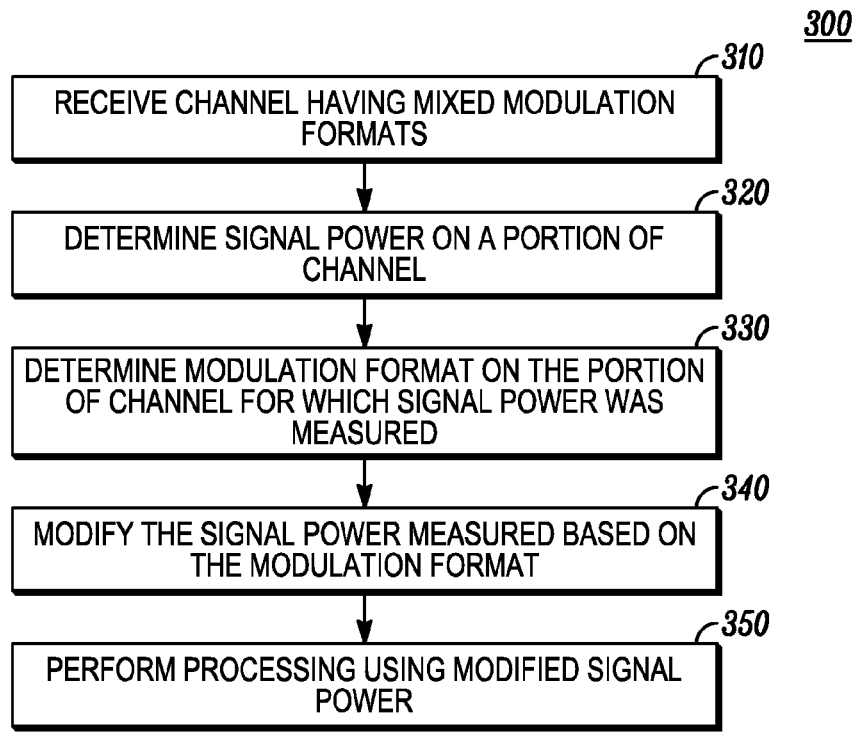
FIG. 3 is a process flow diagram.
Figure 4:
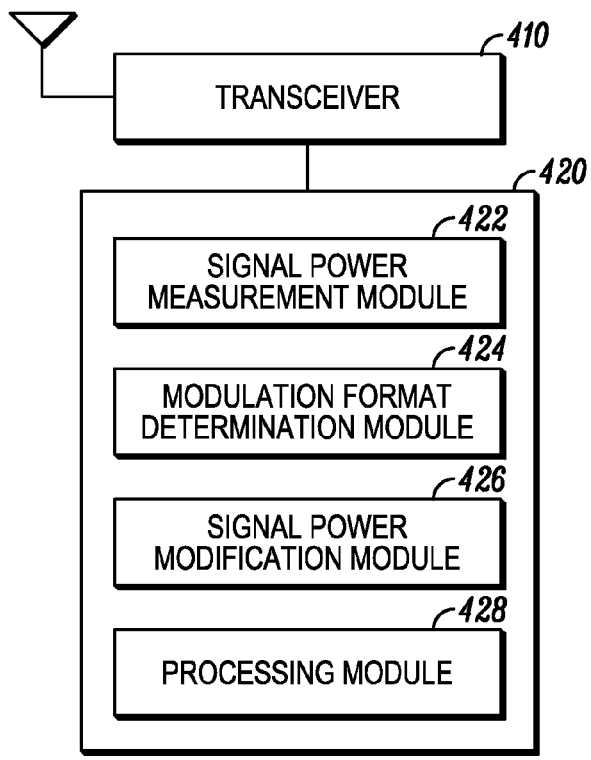
FIG. 4 illustrates a wireless communication terminal.

In FIG. 3, at 310, the user terminal receives a signal on a channel having mixed modulation formats, for example, GMSK and 8-PSK. In FIG. 4, the terminal 400 includes a transceiver 410 for receiving such signals. In FIG. 3, at 320, the terminal determines signal power on a portion of the received channel. The signal power is thus generally measured on different portions of the channel, for example, during different timeslots while the terminal is synchronized with the channel. In one embodiment, the signal power measurements are made on a mid-amble, for example, the 26 bit mid-amble, of a time slot while the terminal is synchronized with the channel.

In FIG. 4, a controller 420, communicably coupled to the transceiver 410, is configured to measure signal power on a portion of the signal received by the transceiver. The controller includes a signal power measurement module 422 for measuring signal power as discussed above. Such a module could be implemented in software executed by the controller, which may be embodied as a processor and/or a digital signal processor (DSP), or it may be implemented as a hardware equivalent circuit. In one embodiment, the signal power measurements are made on a BCCH carrier, on which the mobile terminal also performs channel synchronization and channel identification for handover and reselection. More generally, in other embodiments, the signal power measurements may also be performed on other channels.

In FIG. 3, at 330, the terminal determines the modulation format on the portion of the channel on which signal power was measured at 320. The modulation format is determined generally from a mid-amble portion of the time slot. In FIG. 4, the controller includes a modulation format determination module 424. This module may be implemented in software executed by the controller or by a hardware equivalent circuit.

In GERAN applications, the terminal may use knowledge that time slot TS=0 has GMSK modulation and TS=7 (is full PWR, either GMSK or 8-PSK modulation). Since the modulation is always GSMK on timeslot 0, timeslot 0 is always at full power and no power compensation is required on timeslot 0. For timeslot 7, the signal is transmitted at full power. This means that the −4 dB allowance for 8-PSK modulation is not allowed on this timeslot. Thus the modulation detection is not relevant on timeslot 7 and thus no power compensation is required on timeslot 7.

In FIG. 3, at 340, the terminal modifies the signal power measured based generally on the modulation format on the portion of the channel on which the signal power was measured. In FIG. 4, the terminal includes a signal power modification module for modifying the signal power based on the modulation format. This module may be implemented in software executed by the controller or by a hardware equivalent circuit.

In one embodiment, the signal power is modified using a calibration factor that is based upon the modulation format. The calibration factor may be determined based on a ratio of signal powers measured within different time slots or portions of the channel having mixed modulation formats. The measurements used in the ratio are made on time slots having the different modulation formats. Thus the ratio can only be determined if timeslots containing both modulation types are detected. In one application, the calibration factor is determined during a traffic channel idle frame when the terminal is assigned a traffic channel. Measurements may also be made during empty frames of a half rate channel. In some embodiments, the calibration factor is determined by the mobile terminal. Alternatively, the calibration factor is received in a message, for example, an overhead message, from a network infrastructure entity. In embodiments where the network computes the calibration factor, the computation may be based upon power measurement information, discussed above, provided by the user terminal.

In another more general embodiment a wireless communication user terminal receives a signal on a channel having bursts transmitted at different power levels. For example, the channel may be a broadcast control channel (BCCH) having information bursts transmitted at higher power levels than other bursts. In one embodiment, the BCCH includes dummy bursts having lower power levels, for example, 4 dB lower, than information bursts to reduce interference in adjacent cells. The bursts on the BCCH may also have the same modulation, for example, GMSK or some other format.

In FIG. 3, at 350, the terminal performs processing based on the modified signal power information. For example, the terminal may report the modified signal power to a network infrastructure entity, like a base station. The terminal may also use the modified signal power information to perform channel ranking and selection, among other known applications for signal power.

While the present disclosure and the best modes thereof have been described in a manner establishing possession and enabling those of ordinary skill to make and use the same, it will be understood and appreciated that there are equivalents to the exemplary embodiments disclosed herein and that modifications and variations may be made thereto without departing from the scope and spirit of the inventions, which are to be limited not by the exemplary embodiments but by the appended claims.

What is claimed is:

1. A method in a wireless communication user terminal that receives a channel having mixed modulation formats, the method comprising:
 receiving a signal on a channel having mixed modulation formats;
 measuring signal power on a portion of the signal received by the terminal;
 determining a modulation format on the portion of the signal for which the signal power was measured;
 modifying the signal power measured based on the modulation format.

2. The method of claim 1, modifying the signal power using a calibration factor.

3. The method of claim 2,
 measuring signal power includes measuring power on a portion of the signal within at least two different timeslots while synchronized with the channel,
 determining the calibration factor based on a ratio of the powers measured within the different time slots.

4. The method of claim 3, determining the calibration factor during a traffic channel idle frame when the terminal is assigned a traffic channel.

5. The method of claim 1, measuring the signal power on a broadcast channel.

6. The method of claim 1, reporting the modified signal power to another entity.

7. The method of claim 1, performing processing on the terminal using modified signal power.

8. The method of claim 1, receiving a calibration factor in an overhead message, and modifying the signal power using the calibration factor.

9. The method of claim 8, reporting the modified signal power to another entity.

10. A wireless communication user terminal, comprising:
 a transceiver for receiving a signal on a channel having mixed modulation formats;
 a controller communicably coupled to the transceiver,
 the controller configured to measure signal power on a portion of the signal received by the transceiver, to determine a modulation format on the portion of the signal for which the signal power was measured, and to modify the signal power measured based on the modulation format.

11. The terminal of claim 10, the controller configured to modify the signal power using a calibration factor.

12. The terminal of claim 11, the controller configured to measure the signal power by measuring power on a portion of the signal within at least two different timeslots while synchronized with the channel, and to determine the calibration factor based on a ratio of the powers measured within the different time slots.

13. The terminal of claim 12, the controller configured to determine the calibration factor during a traffic channel idle frame when the terminal is assigned a traffic channel.

14. The terminal of claim 10, the controller configured to measure the signal power on a broadcast channel.

15. The terminal of claim 10, the terminal configured to report the modified signal power to another entity.

16. The terminal of claim 10, the controller configured to perform processing using the modified signal power.

17. The terminal of claim 10, the transceiver for receiving a calibration factor in an overhead message, and the controller configured to modify the signal power using the received calibration factor.

18. The terminal of claim 10, the transceiver configured to transmit the modified signal power to another entity.

* * * * *